United States Patent [19]
Kalnin

[11] 3,723,607
[45] Mar. 27, 1973

[54] SURFACE MODIFICATION OF CARBON FIBERS

[75] Inventor: Ilmar L. Kalnin, Millington, N.J.

[73] Assignee: Celanese Corporation, New York, N.Y.

[22] Filed: July 16, 1970

[21] Appl. No.: 55,562

[52] U.S. Cl. ............423/447, 423/460, 106/307, 260/37
[51] Int. Cl. ............................................C01b 31/07
[58] Field of Search..........23/209.1, 209.2; 106/307; 260/37

[56] References Cited

UNITED STATES PATENTS

| | | | |
|---|---|---|---|
| 3,476,703 | 11/1969 | Wadsworth et al. | 260/37 |
| 3,565,657 | 2/1971 | Dannenberg et al. | 106/307 |
| 3,216,843 | 11/1965 | Heller et al. | 106/307 |

OTHER PUBLICATIONS

Sach et al. "Chemical Abstracts" Vol. 71, 1969, 103026h

*Primary Examiner*—Edward J. Meros
*Attorney*—Thomas J. Morgan, Charles B. Barris and Kenneth E. Macklin

[57] ABSTRACT

A process is provided for modifying the surface characteristics of a carbonaceous fibrous material (either amorphous carbon or graphitic carbon) and to thereby facilitate enhanced adhesion between the fibrous material and a resinous matrix material. The fibrous material is initially heat treated in an inert gaseous atmosphere, and is subsequently heated in a gaseous atmosphere which includes a substantial quantity of ozone under conditions found capable of producing the desired surface modification. Composite articles of enhanced interlaminar shear strength are formed by incorporating the fibers modified in accordance with the present process in a resinous matrix material.

17 Claims, No Drawings

SURFACE MODIFICATION OF CARBON FIBERS

BACKGROUND OF THE INVENTION

In the search for high performance materials, considerable interest has been focused upon carbon fibers. The term "carbon fibers" is used herein in its generic sense and includes graphite fibers as well as amorphous carbon fibers. Graphite fibers are defined herein as fibers which consist essentially of carbon and have a predominant X-ray diffraction pattern characteristic of graphite. Amorphous carbon fibers, on the other hand, are defined as fibers in which the bulk of the fiber weight can be attributed to carbon and which exhibit an essentially amorphous X-ray diffraction pattern. Graphite fibers generally have a higher Young's modulus than do amorphous carbon fibers and in addition are more highly electrically and thermally conductive.

Industrial high performance materials of the future are projected to make substantial utilization of fiber reinforced composites, and carbon fibers theoretically have among the best properties of any fiber for use as high strength reinforcement. Among these desirable properties are corrosion and high temperature resistance, low density, high tensile strength, and high modulus. Graphite is one of the very few known materials whose tensile strength increases with temperature. Uses for carbon fiber reinforced composites include aerospace structural components, rock motor casings, deep-submergence vessels and ablative materials for heat shields on re-entry vehicles.

In the prior art numerous materials have been proposed for use as possible matrices in which carbon fibers may be incorporated to provide reinforcement and produce a composite article. The matrix material which is selected is commonly a thermosetting resinous material and is commonly selected because of its ability to also withstand elevated temperatures.

While it has been possible in the past to provide carbon fibers of highly desirable strength of modulus characteristics, difficulties have arisen when one attempts to gain the full advantage of such properties in the resulting carbon fiber reinforced composite article. Such inability to capitalize upon the superior single filament properties of the reinforcing fiber has been traced to inadequate adhesion between the fiber and the matrix material in the resulting composite article.

Various techniques have been proposed in the past for modifying the fiber properties of a previously formed carbon fiber in order to make possible improved adhesion when incorporated in a composite article. See, for instance, British Pat. No. 1,180,441 to Nicholas J. Wadsworth and William Watt wherein it is taught to heat a carbon fiber normally within the range of 350° to 850°C. (e.g. 500° to 600°C.) in an oxidizing atmosphere such as air for an appreciable period of time. Other atmospheres contemplated for use in the process include an oxygen rich atmosphere, pure oxygen, nitrous oxide, and nitrogen dioxide.

It is an object of the invention to provide a process for efficiently modifying the surface characteristics of carbon fibers.

It is an object of the invention to provide a process which may be readily conducted on a continuous basis for modifying the surface characteristics of carbon fibers.

It is an object of the invention to provide a process for improving the ability of carbon fibers to bond to a resinous matrix material.

It is an object of the invention to provide a process for modifying the surface characteristics of carbon fibers which may be conducted relatively rapidly.

It is another object of the invention to provide composite articles exhibiting improved interlaminar shear strength.

These and other objects, as well as the scope, nature, and utilization of the invention will be apparent from the following detailed description and appended claims.

Summary of the Invention

It has been found that a process for the modification of the surface characteristics of a carbonaceous fibrous material containing at least about 90 per cent carbon by weight comprises: (a) heating said carbonaceous fibrous material in an inert gaseous atmosphere provided at a temperature of about 900° to 1,400°C. for at least about 10 seconds, and (b) subsequently heating said carbonaceous fibrous material in a gaseous atmosphere containing a substantial quantity of ozone provided at a temperature of about 75° to 175°C. for at least about 30 seconds.

The resulting carbon fibers may be incorporated in a resinous matrix material to form a composite article exhibiting enhanced interlaminar shear strength.

DESCRIPTION OF PREFERRED EMBODIMENTS

The Starting Material

The fibers which are modified in accordance with the present process are carbonaceous and contain at least about 90 percent carbon by weight. Such carbon fibers may exhibit either an amorphous carbon or a predominantly graphitic carbon x-ray diffraction pattern. In a preferred embodiment of the process the carbonaceous fibers which undergo surface treatment contain at least about 95 percent carbon by weight, and at least about 99 percent carbon by weight in a particularly preferred embodiment of the process.

The carbonaceous fibrous material may be present in a variety of physical configurations provided substantial access to the fiber surface is possible during the surface modification steps described hereafter. The carbon fibers may be provided as relatively short discontinuous lengths or as continuous lengths. It is preferred that the carbon fibers be present as continuous lengths. For instance, the carbonaceous fibrous materials may assume the configuration of a continuous length of a multifilament yarn, tape, tow, strand, cable, or similar fibrous assemblage. In a preferred embodiment of the process the carbonaceous fibrous material is a continuous multifilament yarn.

The carbonaceous fibrous material which is treated in the present process optionally may be provided with a twist which tends to improve the handling characteristics. For instance, a twist of about 0.1 to 5 tpi, and preferably about 0.3 to 1.0 tpi, may be imparted to a multifilament yarn. Also, a false twist max be used instead of or in addition to a real twist. Alternatively, one may select continuous bundles of fibrous material which possess essentially no twist.

The carbonaceous fibers which serve as the starting material in the present process may be formed in accordance with a variety of techniques as will be apparent to those skilled in the art. For instance, organic polymeric fibrous materials which are capable of undergoing thermal stabilization may be initially stabilized by treatment in an appropriate atmosphere at a moderate temperature (e.g. 200° to 400°C.), and subsequently heated in an inert atmosphere at a more highly elevated temperature, e.g. 900° to 1,000°C., or more, until a carbonaceous fibrous material is formed. If the thermally stabilized material is heated to a maximum temperature of 2,000° to 3,100°C. (preferably 2,400° to 3,100°C.) in an inert atmosphere, substantial amounts of graphitic carbon are commonly detected in the resulting carbon fiber, otherwise the carbon fiber will commonly exhibit an essentially amorphous X-ray diffraction pattern.

The exact temperature and atmosphere utilized during the initial stabilization of an organic polymeric fibrous material commonly vary with the composition of the precursor as will be apparent to those skilled in the art. During the carbonization reaction elements present in the fibrous material other than carbon (e.g. oxygen and hydrogen) are substantially expelled. Suitable organic polymeric fibrous materials from which the fibrous material capable of undergoing carbonization may be derived include an acrylic polymer, a cellulosic polymer, a polyamide, a polybenzimidazole, polyvinyl alcohol, etc. As discussed hereafter, acrylic polymeric materials are particularly suited for use as precursors in the formation of carbonaceous fibrous materials. Illustrative examples of suitable cellulosic materials include the natural and regenerated forms of cellulose, e.g. rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole.

A fibrous acrylic polymeric material prior to stabilization may be formed primarily of recurring acrylonitrile units. For instance, the acrylic polymer should contain not less than about 85 mol per cent of recurring acrylonitrile units with not more than about 15 mol per cent of a monovinyl compound which is copolymerizable with acrylonitrile such as styrene, methyl acrylate, methyl methacrylate, vinyl acetate, vinyl chloride, vinylidene chloride, vinyl pyridine, and the like, or a plurality of such monovinyl compounds.

During the formation of a preferred carbonaceous fibrous material for use in the present process multifilament bundles of an acrylic fibrous material may be initially stabilized in an oxygen-containing atmosphere (i.e. preoxidized) on a continuous basis in accordance with the teachings of U.S. Ser. No. 749,957, filed Aug. 5, 1968, of Dagobert E. Stuetz, which is assigned to the same assignee as the present invention and is herein incorporated by reference. More specifically, the acrylic fibrous material should be either an acrylonitrile homopolymer or an acrylonitrile copolymer which contains no more than about 5 mol percent of one or more monovinyl comonomers copolymerized with acrylonitrile. In a particularly preferred embodiment of the process the fibrous material which is preoxidized in an oxygen-containing atmosphere is black in appearance, contains a bound oxygen content of at least about 7 percent by weight as determined by the Unterzaucher analysis, retains its original fibrous configuration essentially intact, and is non-burning when subjected to an ordinary match flame.

In preferred techniques for forming the starting material for the present process a stabilized acrylic fibrous material is carbonized and graphitized while passing through a temperature gradient present in a heating zone in accordance with the procedures described in commonly assigned U.S. Ser. No. 777,275, filed Nov. 20, 1968 of Charles M. Clarke; 17,780, filed Mar. 9, 1970 of Charles M. Clarke, Michael J. Ram, and John P. Riggs; and 17,832, filed Mar. 9, 1970 of Charles M Clarke, Michael J. Ram, and Arnold J. Rosenthal. Each of these disclosures is herein incorporated by reference.

In accordance with a particularly preferred carbonization and graphitization technique a continuous length of stabilized acrylic fibrous material which is non-burning when subjected to an ordinary match flame and derived from an acrylic fibrous material selected from the group consisting of an acrylonitrile homopolymer and acrylonitrile copolymers which contain at least about 85 mol percent of acrylonitrile units and up to about 15 mol per cent of one or more monovinyl units copolymerized therewith is converted to a graphitic fibrous material while preserving the original fibrous configuration essentially intact while passing through a carbonization/graphitization heating zone containing an inert gaseous atmosphere and a temperature gradient in which said fibrous material is raised within a period of about 20 to about 300 seconds from about 800°C. to a temperature of about 1,600°C. to form a continuous length of carbonized fibrous material, and in which said carbonized fibrous material is subsequently raised from about 1,600°C. to a maximum temperature of at least about 2,400°C. within a period of about 3 to 300 seconds where it is maintained for about 10 seconds to about 200 seconds to form a continuous length of graphitic fibrous material.

The equipment utilized to produce the heating zone used to produce the carbonaceous starting material may be varied as will be apparent to those skilled in the art. It is essential that the apparatus selected be capable of producing the required temperature while excluding the presence of an oxidizing atmosphere.

In a preferred technique the continuous length of fibrous material undergoing carbonization is heated by use of an induction furnace. In such a procedure the fibrous material may be passed in the direction of its length through a hollow graphite tube or other susceptor which is situated within the windings of an induction coil. By varying the length of the graphite tube, the length of the induction coil, and the rate at which the fibrous material is passed through the graphite tube, many apparatus arrangements capable of producing carbonization or carbonization and graphitization may be selected. For large scale production, it is of course preferred that relatively long tubes or susceptors be used so that the fibrous material may be passed through the same at a more rapid rate while being carbonized or carbonized and graphitized. The temperature gradient of a given apparatus may be determined by conventional optical pyrometer measurements as will be apparent to those skilled in the art. The fibrous material because of its small mass and relatively large surface area instantaneously assumes essentially the same temperature as that of the zone through which it is continuously passed.

Surface Treatment in an Inert Gaseous Atmosphere

The carbonaceous fibrous material is initially subjected to a heat treatment in an inert gaseous atmosphere for at least about 10 seconds under conditions found capable rendering the surface of the fiber highly amenable to treatment in an ozone-containing gaseous atmosphere as described hereafter.

Suitable inert gaseous atmospheres for use in the initial heat treatment step include nitrogen, argon, helium, etc. The preferred gaseous atmosphere is nitrogen. The inert gaseous atmosphere is provided at a temperature of about 900° to 1,400°C. when contacted with the carbonaceous fibrous material. In a preferred embodiment of the process the gaseous atmosphere is provided at a temperature of about 1,150° to 1,250°C.

The contact time between the inert gaseous atmosphere and the carbonaceous fibrous material is preferably at least about 30 seconds (e.g. 30 seconds to 10 minutes). The minimum residence time for contact with the inert gaseous atmosphere varies with the temperature of the gaseous atmosphere. Generally the higher the temperature of the gaseous atmosphere, the shorter the minimum residence time. If the inert gaseous atmosphere is provided at a temperature of 1,150° to 1,250°C. residence times of about 30 to 180 seconds are preferred. If the inert gaseous atmosphere is provided at a temperature of about 1,400°C., residence times as brief as about 10 seconds are generally adequate. When the inert gaseous atmosphere is provided at about 900°C., residence times of up to 5 minutes, or more, may be desirable. Generally, residence times of about 10 seconds to 10 minutes are employed to carry out the desired surface modification within the temperature range of 900 to 1,400°C. Longer residence times may be employed without deleterious results, but generally yield no commensurate advantage. When the carbonaceous fibrous material is provided as a relatively compact assemblage of a plurality of fibers, then longer residence times may be advantageously employed as will be apparent to those skilled in the art.

The present heat treatment step may be conducted either on a batch or on a continuous basis. For instance, in a batch treatment the carbonaceous fibrous material may be wound upon a frame, bobbin, or other support which is capable of withstanding the highly elevated temperature and placed in a suitable heating zone. Alternatively, a length of the fibrous material may be suspended statically within the heat treatment zone for an appropriate residence time. In a preferred embodiment of the process a continuous length of carbonaceous fibrous material is continuously passed (e.g. in the direction of its length) for an appropriate residence time through an inert gaseous atmosphere provided at the desired temperature.

The theory whereby the present heat treatment step which is conducted in an inert gaseous atmosphere enhances the surface modification achieved in the overall process is considered complex and incapable of simple explanation. It is believed, however, the initial heat treatment step performs a thermal cleaning function which facilitates the attainment of significantly enhanced overall results when used in combination with the specific ozone treatment described hereafter. For instance, since a weight loss of about 0.5 to 5 percent is commonly observed during the initial heat treatment step it is hypothesized that loose crystallites, absorbed water, volatiles, yarn sizing or finishes, condensed pyrolysis products, and other impurities are substantially removed thereby providing a surface which is particularly suited for subsequent modification in an ozone-containing atmosphere as described hereafter.

Surface Treatment in an Ozone-Containing Gaseous Atmosphere

The carbonaceous fibrous material subsequently is subjected to a heat treatment under substantially less severe temperature conditions in a gaseous atmosphere containing a substantial quantity of ozone. Such gaseous atmosphere is provided at a temperature of about 75° to 175°C., and preferably at a temperature of about 125° to 150°C.

The contact time between the gaseous atmosphere containing a substantial quantity of ozone and the carbonaceous fibrous material is preferably at least about 30 seconds (e.g. 30 seconds to 30 minutes). In a particularly preferred embodiment of the process a contact time of at least about 1 minute is utilized (e.g. about 1 to 15 minutes). Longer residence times may be employed but generally yield no commensurate advantage. When the carbonaceous fibrous material is provided as a relatively compact assemblage of a plurality of fibers, then longer residence times may be advantageously employed as will be apparent to those skilled in the art. Also, the residence time selected will be influenced to some degree by the concentration of ozone in the gaseous atmosphere and the temperature of the gaseous atmosphere. A weight loss of about 0 to 0.5 percent is commonly observed during the heat treatment step in the ozone-containing atmosphere.

The ozone-containing atmosphere may be generated by conventional techniques such as by the electronic irradiation of a molecular oxygen-containing gas such as air or pure oxygen. Air may be conveniently selected to undergo ozonization. It is recommended that the molecular oxygen-containing atmosphere which is subjected to ozonization be essentially free of moisture. Conventional gas driers may be used to remove moisture from the molecular oxygen-containing atmosphere prior to feeding the same to an ozonizer.

In a preferred embodiment of the process ozone is present in the gaseous atmosphere containing a substantial quantity of ozone in a concentration of about 1500 to 110,000 parts per million (i.e. about 2 to 150 mg. per liter). In a particularly preferred embodiment of the process ozone is present in the gaseous atmosphere containing a substantial quantity of ozone in a concentration of about 15,000 to 60,000 parts per million (i.e. about 20 to 80 mg. per liter). Higher ozone concentrations may be employed, but are generally difficult to achieve with conventional ozonization equipment.

The present heat treatment step may be conducted either on a batch or on a continuous basis. For instance, in a batch treatment the carbonaceous fibrous material may be wound upon a frame, bobbin, or other support which is capable of withstanding the highly elevated temperature and placed in a suitable heating zone. Alternatively, a length of the fibrous material may be suspended statically within the heat treatment zone for an appropriate residence time. In a preferred embodiment of the process a continuous length of carbonaceous fibrous material is continuously passed (e.g. in the direction of its length) for an appropriate residence time through an ozone-containing gaseous atmosphere provided at the desired temperature.

For optimum results it is recommended that the carbonaceous fibrous material following treatment in the inert gaseous atmosphere and prior to treatment in the ozone-containing atmosphere not be exposed to atmospheric conditions to any substantial degree wherein volatiles, such as water vapor, may be absorbed upon the fiber surface. Accordingly in a preferred embodiment of the process intermediate exposure to atmospheric conditions between the two heat treatment steps is substantially avoided.

The theory whereby the heat treatment in the ozone-containing atmosphere serves to enhance the surface characteristics of the carbonaceous fibrous material is believed to reside in the imparting to the fiber surface of oxygen-containing functional groups. If the temperature of the ozone-containing atmosphere much exceeds 175°C., then any functional groups imparted to the carbonaceous fiber are substantially desorbed. If the temperature of the ozone-containing atmosphere is much below 75°C. then the imparting of functional groups to the fiber surface tends to be inordinately slow. If one attempts to substitute ordinary air or pure oxygen for the ozone-containing atmosphere in the second step of the present process, no further enhancement of the fiber surface characteristics results. The presence of water in contact with the fiber surface during or after the surface modification treatment described herein tends to interfere with the desired surface modification or results in at least a partial diminution of its effectiveness.

The surface modification imparted to the carbonaceous fibrous material through the use of the present process has been found to exhibit an appreciable life which is not diminished to any substantial degree even after the passage of 14, or more days.

The surface treatment of the present process makes possible improved adhesive bonding between the carbonaceous fibers, and a resinous matrix material. Accordingly, carbon fiber reinforced composite materials which incorporate fibers treated as heretofore described exhibit enhanced shear strength, flexural strength, compressive strength, etc. The resinous matrix material employed in the formation of such composite materials is commonly a polar thermosetting resin such as an epoxy, a polyimide, a polyester, a phenolic, etc. The impregnation of the surface modified carbonaceous fibers with the matrix forming resinous material is preferably conducted below about 175°C. (e.g. about 60° to 120°C.). The carbonaceous fibrous material is commonly provided in such resulting composite materials in either an aligned or random fashion in a concentration of about 20 to 70 percent by volume.

The following examples are given as specific illustrations of the invention. It should be understood, however, that the invention is not limited to the specific details set forth in the examples.

Example I

A length of carbonaceous yarn having a carbon content in excess of 99 percent by weight and exhibiting a predominantly graphitic x-ray diffraction pattern was selected as the starting material. The carbonaceous yarn was derived from a cellulosic precursor and was commercially available from the Union Carbide Co. under the designation of Thornel 50. The yarn consisted of a 2 ply 1440 fil bundle having a total denier of about 700. The yarn had specific gravity of about 1.6 and a single filament tenacity of about 11.5 grams per denier.

The length of carbonaceous yarn was subjected to the surface modification treatment of the present process with each of the two surface treatment steps being conducted upon a batch basis.

The length of yarn was initially placed for about 30 seconds in a heat treatment zone containing a circulating preheated nitrogen atmosphere provided at a temperature of about 1,200°C. The heat treatment zone consisted of a 1.5 inch I.D. ceramic tube inserted in a Lindberg Hevi-Duty resistance-heated oven wherein the carbonaceous yarn was positioned by means of a fused silica boat. During the heat treatment step a weight loss of about 2.5 percent was observed, and a single filament tenacity of the carbonaceous yarn was substantially unchanged.

Upon removal the yarn was immediately placed for about 5 minutes in a heat treatment zone provided at a temperature of 125°C. containing a substantial quantity of ozone. The heat treatment zone consisted of a Pyrex reaction kettle of 2 liter capacity wherein the carbonaceous yarn was positioned by placement upon an aluminum screen support near the bottom of the kettle. Ozonized air containing ozone is a concentration of about 15,000 parts per million (20 mg. per liter) was continuously introduced into the reaction tube of the heat treatment zone at a rate of about 1.0 l./min. for 5 minutes. The ozone-containing atmosphere was prepared by initially passing air through a McGraw-Edison Lectro-Dryer Lab Model B, and then through a Model T-408 ozonizer manufactured by the Welsbach Corporation. A potential of 100 volts was supplied to the primary of the ozonizer. During the heat treatment step a weight loss of about 0.2 percent was observed, and the single filament tenacity of the carbonaceous yarn was substantially unchanged.

A composite article was next formed employing the surface modified yarn as a reinforcing medium in a resinous matrix. The composite article was a rectangular bar consisting of about 50 percent by volume of the yarn and having dimensions of ⅛ inch × ¼ inch × 5 inch. The composite article was formed by impregnation of the yarn in a liquid epoxy resin-hardener mixture at 60°C. followed by unidirectional layup of the required quantity of the impregnated yarn in a steel mold and compression molding of the layup for 2 hours at 93°C., and 2 hours at 200°C. in a heated platen press at about 50 psi pressure. The mold was then cooled slowly to room temperature, and the composite article was removed from the mold cavity and cut to the desired size for testing. The resinous matrix material used in the formation of the composite article was provided as a solventless system which contained 100 parts by weight of a condensation product of bisphenol A (4,4'-isopropylidene diphenol) and epichlorohydrin marketed by the Celanese Coatings Company under the designation Epi-Rez 508, and 70 parts by weight of a hexahydrophthalic acid anhydride curing agent.

The horizontal interlaminar shear strength was determined by short beam testing of the carbon fiber reinforced composite according to procedure of ASTM D2344–65T as modified for straight bar testing at a 5:1 span to depth ratio. The average horizontal interlaminar shear strength of composite articles incorporating fibers modified in accordance with the present invention as heretofore described was 7,300 psi.

For comparative purposes a composite article was formed as heretofore described employing an identical carbonaceous yarn as received without subjecting the same to any form of surface modification. The average horizontal interlaminar shear strength of such composite article was only 3,800 psi.

For comparative purposes a composite article was formed as heretofore described employing an identical carbonaceous yarn which had been subjected solely to the heat treatment step of the present process in the nitrogen atmosphere, with the subsequent heat treatment step in an ozone-containing atmosphere being omitted. The average horizontal interlaminar shear strength of such composite article was enhanced to 6,500 psi, but fell substantially short of the value obtained when the complete process of the present invention was practiced.

For comparative purposes a composite article was formed as heretofore described employing an identical carbonaceous yarn which was subjected solely to the heat treatment step of the present process in the ozone-containing atmosphere, with the initial heat treatment step in the nitrogen atmosphere being omitted. The average horizontal interlaminar shear strength of such composite article was enhanced to 5,300 psi, but fell substantially short of the value obtained when the complete process of the present invention was practiced.

Example II

The complete batch surface modification process of Example I was repeated with the exception the heat treatment step was conducted in the ozone-containing atmosphere for 15 minutes, rather than 5 minutes. A composite article was formed as heretofore described which incorporated the surface modified carbonaceous yarn. The average horizontal interlaminar shear strength of such composite article was 8,300 psi, and accordingly exceeded the value obtained in Example I by 1,000 psi.

Example III

A length of high strength-high modulus carbonaceous yarn derived from an acrylonitrile homopolymer yarn in accordance with the processes described in U.S. Ser. Nos. 749,957, filed Aug. 5, 1968, and 777,275, filed Nov. 20, 1968 is selected as the starting material. The yarn consists of a 1,600 fil bundle having a total denier of about 1,000, has a carbon content in excess of 99 percent by weight, and exhibits a predominantly graphitic x-ray diffraction pattern.

The yarn is continuously unwound from a bobbin and is continuously passed at a rate 1 meter per minute through a pair of heat treatment zones provided in series with appropriate atmospheres and temperatures.

The initial heat treatment zone consists of a 2 meter ceramic tube inserted in an electrically heated furnace provided with a 0.75 meter zone uniformly heated at 1,200°C. which is continuously supplied with nitrogen preheated at about 1,200°C. Air is excluded from the initial heat treatment zone through the use of a nitrogen overpressure which exits through a small opening at each end of the oven through which the yarn passes. The carbonaceous yarn is in contact with the nitrogen atmosphere at a temperature of about 1,200°C. for about 45 seconds.

Upon exiting from the initial heat treatment zone the carbonaceous yarn is immediately passed to an ozone-containing heat treatment zone consisting of a similar tube furnace having a length of 2 meters which is provided with a 1.5 meter zone uniformly heated at 125°C. which is continuously supplied with predried preheated ozonized air at about 125°C. Ozone is present in the ozonized air in a concentration of about 30.000 parts per million (40 mg. per liter). The carbonaceous yarn is in contact with the ozone-containing atmosphere at a temperature of about 125°C. for about 90 seconds. Since the ozonized air is provided at an overpressure, atmospheric gases such as water vapor are excluded from the heat treatment zone.

The resulting surface modified carbonaceous fiber may next be utilized as a reinforcing medium in the formation composite articles by incorporation in a resinous matrix material.

Although the invention has been described with preferred embodiments, it is to be understood that variations and modifications may be resorted to as will be apparent to those skilled in the art. Such variations are to be considered within the purview and scope of the claims appended hereto.

I claim:

1. A process for the modification of the surface characteristics of a carbonaceous fibrous material containing at least about 90 percent carbon by weight so as to improve its ability to bond to a resinous matrix material comprising:
    a. heating said carbonaceous fibrous material in an inert gaseous atmosphere provided at a temperature of about 900° to 1,400°C. for at least about 10 seconds, and
    b. subsequently heating said carbonaceous fibrous material in a gaseous atmosphere containing a substantial quantity of ozone provided at a temperature of about 75° to 175°C. for at least about 30 seconds.

2. An improved process according to claim 1 wherein said carbonaceous fibrous material includes a substantial quantity of graphitic carbon.

3. A process according to claim 1 wherein said inert gaseous atmosphere is nitrogen.

4. A process according to claim 1 wherein said inert gaseous atmosphere is argon.

5. A process according to claim 1 wherein said carbonaceous fibrous material is heated in said inert gaseous atmosphere for about 10 seconds to 10 minutes.

6. A process according to claim 1 wherein said inert gaseous atmosphere is provided at a temperature of about 1,150° to 1,250°C., and said carbonaceous fibrous material is maintained in said atmosphere for about 30 to 180 seconds.

7. A process according to claim 1 wherein said carbonaceous fibrous material is heated in said gaseous atmosphere containing a substantial quantity of ozone for about 30 seconds to 30 minutes.

8. A process according to claim 1 wherein said gaseous atmosphere containing a substantial quantity of ozone is provided at a temperature of about 125° to 150°C.

9. A process according to claim 1 wherein said ozone is present in said gaseous atmosphere containing a substantial quantity of ozone in a concentration of about 1,500 to 110,000 parts per million.

10. A process according to claim 1 wherein substantial exposure of the fibrous material to atmospheric conditions is avoided between step (a) and (b).

11. A process for the modification of the surface characteristics of a graphitic fibrous material so as to improve its ability to bond to a resinous matrix material comprising:
 a. continuously passing in the direction of its length a continuous length of said graphitic fibrous material through a heating zone for about 30 seconds to 10 minutes containing an inert gaseous atmosphere selected from the group consisting of nitrogen, argon, and helium which is provided at a temperature of about 900° to 1,400°C., and
 b. subsequently passing in the direction of its length said continuous length of graphitic fibrous material without substantial intermediate exposure to atmospheric conditions through a heating zone for about 1 to 30 minutes containing a gaseous atmosphere which includes a substantial quantity of ozone provided at a temperature of about 75° to 175°C.

12. A process according to claim 11 wherein said inert gaseous atmosphere is nitrogen.

13. A process according to claim 11 wherein said inert gaseous atmosphere is argon.

14. A process according to claim 11 wherein said inert gaseous atmosphere is provided at a temperature of about 1,150° to 1,250°C., and said graphitic fibrous material is maintained in said atmosphere for about 30 to 180 seconds.

15. A process according to claim 11 wherein said gaseous atmosphere containing a substantial quantity of ozone is provided at a temperature of about 125° to 150°C.

16. A process according to claim 11 wherein said ozone is present in said gaseous atmosphere containing a substantial quantity of ozone in a concentration of about 1,500 to 110,000 parts per million.

17. A process according to claim 11 wherein said ozone is present in said gaseous atmosphere containing a substantial quantity of ozone in a concentration of about 15,000 to 60,000 parts per million.

* * * * *